(12) United States Patent
Tao

(10) Patent No.: US 9,025,003 B2
(45) Date of Patent: May 5, 2015

(54) HEAD BRACKET

(75) Inventor: Zewen Tao, Weihai (CN)

(73) Assignee: Weihai Future Robot Co., Ltd, Weihai, Shandong (CN)

( * ) Notice: Subject to any disclaimer, the term of this patent is extended or adjusted under 35 U.S.C. 154(b) by 778 days.

(21) Appl. No.: 13/338,009

(22) Filed: Dec. 27, 2011

(65) Prior Publication Data

US 2012/0113215 A1 May 10, 2012

Related U.S. Application Data

(63) Continuation of application No. PCT/CN2010/074362, filed on Jun. 24, 2010.

(51) Int. Cl.
| | |
|---|---|
| *H04N 5/225* | (2006.01) |
| *F16M 11/12* | (2006.01) |
| *F16M 11/18* | (2006.01) |
| *F16M 11/22* | (2006.01) |
| *F16M 13/02* | (2006.01) |
| *G03B 37/02* | (2006.01) |
| *H04N 5/232* | (2006.01) |

(Continued)

(52) U.S. Cl.
CPC ............. *F16M 11/12* (2013.01); *H04N 5/2251* (2013.01); *F16M 11/18* (2013.01); *F16M 11/22* (2013.01); *F16M 13/02* (2013.01); *F16M 2200/065* (2013.01); *G03B 37/02* (2013.01); *H04N 5/23238* (2013.01); *H04N 5/247* (2013.01); *G03B 17/561* (2013.01)

(58) Field of Classification Search
CPC .. H04N 5/2251; H04N 5/2252; H04N 5/2253

USPC ........... 348/36, 37, 143, 158, 207.99, 307.99, 348/208.2, 208.99
See application file for complete search history.

(56) References Cited

U.S. PATENT DOCUMENTS

| | | | |
|---|---|---|---|
| 3,935,380 | A | 1/1976 | Coutta |
| 4,272,177 | A | 6/1981 | Ottenheimer |

(Continued)

FOREIGN PATENT DOCUMENTS

| | | | |
|---|---|---|---|
| CN | 101030030 A | 9/2007 | |
| CN | 101398120 A | 4/2009 | |

(Continued)

*Primary Examiner* — Chikaodili E Anyikire
*Assistant Examiner* — David N Werner
(74) *Attorney, Agent, or Firm* — Tim Tingkang Xia, Esq.; Morris, Manning & Martin, LLP

(57) ABSTRACT

A head bracket for providing multiple horizontal panoramic pictures simultaneously comprises a video camera, a longitudinally rotating motor, a transversally rotating motor, sliding rings, a connection interface, and a support. A supporting pipe is arranged at center of head bracket and provided with multiple coaxial heads. Sliding rings are arranged at center of coaxial heads and fixed on supporting pipe. The video camera is mounted on fixing bracket of outer case of sliding rings. A longitudinally rotating belt pulley on video camera is connected to longitudinally rotating motor through a belt, and a transversely rotating belt pulley on sliding ring is connected to the transversely rotating motor through a belt; wherein the transversely rotating motor is fixed on a bottom plate fixed on the supporting pipe. The supporting pipe is internally provided with cables and cable connectors. The connection interface is arranged at the tail end where cables gather.

10 Claims, 11 Drawing Sheets

(51) Int. Cl.
*H04N 5/247* (2006.01)
*G03B 17/56* (2006.01)
*H04N 5/222* (2006.01)
*H04N 5/28* (2006.01)

(56) References Cited

U.S. PATENT DOCUMENTS

| | | | | |
|---|---|---|---|---|
| 4,281,343 | A | * | 7/1981 | Monteiro ........................ 348/81 |
| 4,386,848 | A | * | 6/1983 | Clendenin et al. ........... 356/5.01 |
| 5,128,770 | A | * | 7/1992 | Inana et al. ................ 348/211.4 |
| 5,434,614 | A | * | 7/1995 | Dainty ............................ 348/64 |
| 5,627,616 | A | * | 5/1997 | Sergeant et al. .............. 396/427 |
| 6,203,216 | B1 | * | 3/2001 | Koizumi ........................ 396/427 |
| 6,715,940 | B2 | * | 4/2004 | Top et al. ...................... 396/427 |
| 7,855,728 | B2 | * | 12/2010 | Aoki et al. .................... 348/143 |
| 2005/0206779 | A1 | * | 9/2005 | Aoki et al. .................... 348/373 |
| 2007/0070198 | A1 | * | 3/2007 | Vera et al. ..................... 348/143 |
| 2007/0242134 | A1 | * | 10/2007 | Zernov ............................ 348/81 |
| 2008/0012980 | A1 | * | 1/2008 | Yamane et al. ................ 348/373 |
| 2010/0302436 | A1 | * | 12/2010 | Gasnier et al. ................ 348/373 |

FOREIGN PATENT DOCUMENTS

| | | |
|---|---|---|
| CN | 101424863 A | 5/2009 |
| CN | 101586731 A | 11/2009 |
| JP | 200453616 A | 2/2004 |

* cited by examiner

HEAD BRACKET

CROSS-REFERENCE TO RELATED APPLICATIONS

This application is a continuation of International Patent Application No. PCT/CN2010/074362, filed on Jun. 24, 2010, designating the United States, now pending, which claims priority to Chinese Patent Application No. 200910149900.1, filed on Jun. 25, 2009. The content of the specification is incorporated herein by reference.

FIELD OF THE INVENTION

The present invention relates to a camera supporting device, and in particular, to a head bracket which provides multiple horizontal panoramic pictures simultaneously for different users. The users may remotely control rotating of the head through the network.

BACKGROUND OF THE INVENTION

At present, the single-ball video monitoring head is mainly used in the world. If users desire to view different on-site video pictures, they need to deploy more single-ball heads on site since no modularized head bracket which can be quickly and conveniently deployed is invented to provide multiple horizontal panoramic pictures simultaneously.

SUMMARY OF THE INVENTION

Technical Problem to be Solved

The present invention is directed to solving the technical problem that the existing camera device cannot provide multiple horizontal panoramic pictures simultaneously, and provides a modularized head bracket comprising multiple camera heads and a support.

Technical Solution

The present invention provides a head bracket, comprising a video camera, a longitudinally rotating motor, a transversally rotating motor, sliding rings, a connection interface, and a support; wherein a supporting pipe is arranged at the center of the head bracket and is provided with multiple coaxial heads; sliding rings are arranged at the center of the coaxial heads, the video camera is mounted on the fixing bracket of outer case of the sliding ring, a belt pulley arranged on the video camera is connected to the longitudinally rotating motor through a belt, and a transversely rotating belt pulley on the sliding ring is connected to the transversely rotating motor through a belt; wherein the transversely rotating motor is fixed on a bottom plate which is fixed on the supporting pipe, the supporting pipe is internally provided with cables and plug-type cable connectors, and the connection interface is arranged at the tail end where the cables gather.

Technical Effects

Users can simply and quickly deploy the head bracket on site as required by only connecting the power cables and plug-type cable connector to the cable connection port on the head bracket. In addition, users may also indicate objects on site through the indicator lamp arranged on the head. A pan head bracket uses pancake sliding rings therein, and a camera is fixed on a connection rod and rotates round the sliding ring. A double-sliding ring head bracket provided uses a structure of double sliding rings therein, and a camera is fixed on the middle axial of two groups of sliding rings and rotates round the sliding ring. Multiple different pictures can be transmitted simultaneously after multiple cameras are mounted on the outer case of the sliding ring. On the head bracket for picking up pictures downward, multiple heads for picking up pictures downward are parallelly and horizontally fixed on the supporting rod. The power cable and communication cable of the head are deployed inside the supporting rod and communicated with the plug. Communication during the work is implemented after the plug is connected. The head bracket may be fixed on an electric motor cycle, and powered by a power supply mounted on the electric motor cycle. In this case, the head uses radio signals to transmit data to achieve freely rotation.

BRIEF DESCRIPTION OF THE DRAWINGS

The following describes the present invention in detail with reference to the accompanying drawings. Among the drawings.

Figure 1:
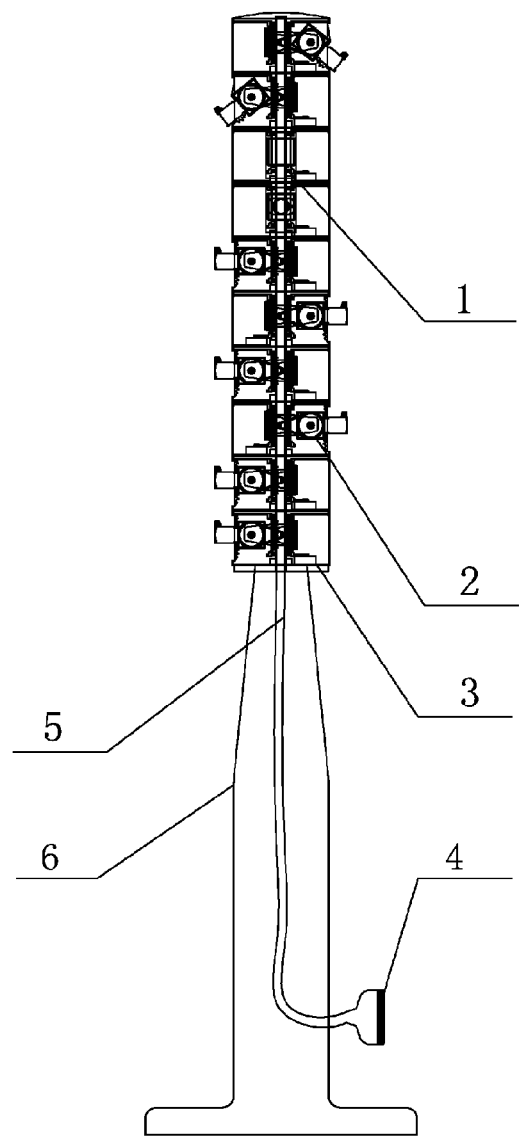
FIG. 1 is a plan view of a columnar coaxial head bracket according to the present invention.
Figure 2:
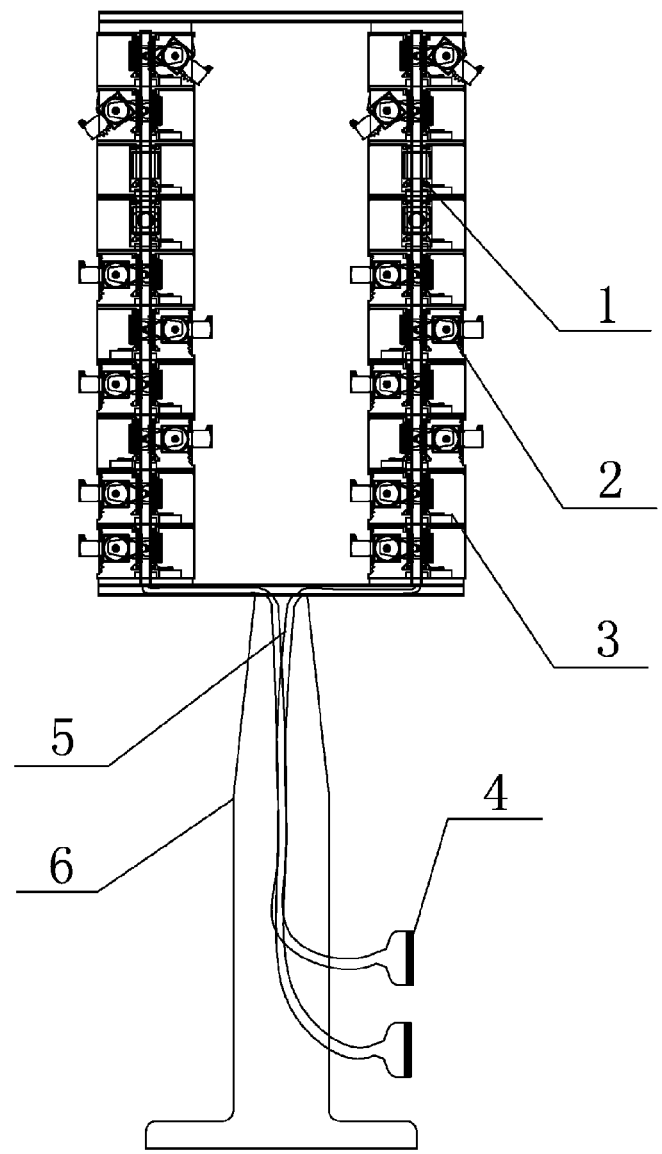
FIG. 2 is a view of a double-transverse pole coaxial head bracket according to the present invention.
Figure 3:
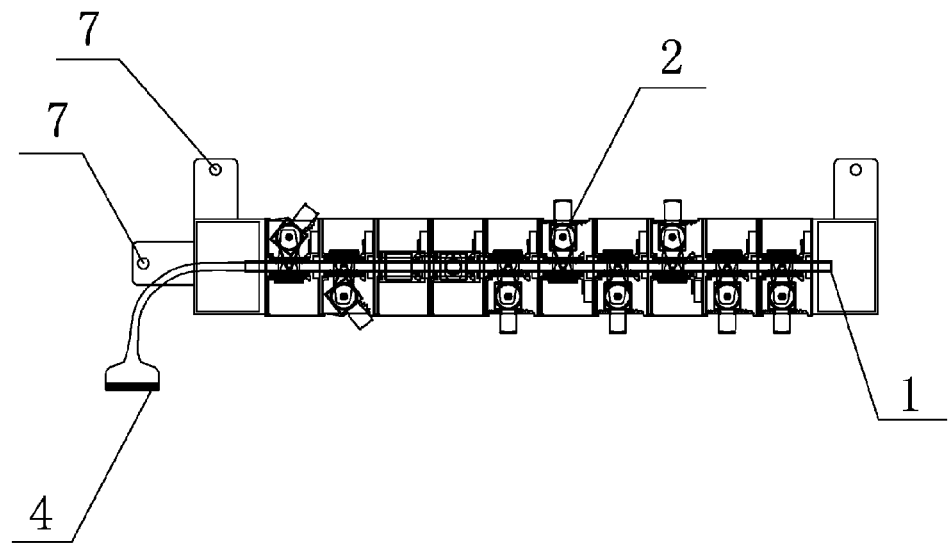
FIG. 3 is a plan view of a suspended head bracket according to the present invention.
Figure 4:
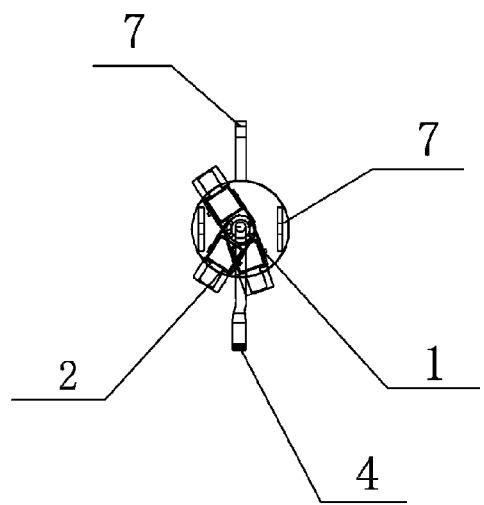
FIG. 4 is a plan view of a suspended coaxial head bracket according to the present invention.

Reference signs and denoted parts or elements: 1—Supporting pipe; 2—Camera; 3—Transversely rotating motor; 4—Cable connection port; 5—Cables; 6—Support; 7—Rack; 8—Supporting frame; 9—Photoflash light; 10—Electric motor cycle; 11—Bottom plate; 12—Transversely rotating belt pulley; 13—Indicator lamp; 14—Outer case; 15—Bearing; 16—Plug; 17—Longitudinally rotating belt pulley; 18—Longitudinally rotating motor; 19—Motorized lens; 20—Top cover; 21—Gear; 22—Worm; 23—Conductive ring; 24—Electric brush; 25—Spacer ring; 26—Inner pipe of the sliding ring; 27—Connection pipe; 28—Sleeve pipe; 29—Connection rod; 30—Upper portion of the pancake sliding ring; 31—Lower portion of the pancake sliding ring; 32—Elastic conductive filament; 33—Cover plate.

DETAILED DESCRIPTION OF THE EMBODIMENTS

As shown in FIGS. 1, 2, 3, 4, 7, 8, 9, 12, and 13, the head bracket according to the present invention comprises a video camera 2, a longitudinally rotating motor 18, a transversally rotating motor 3, sliding rings, a cable connection port 4, and a support 6; wherein a supporting pipe 1 is arranged at the center of the head bracket and is provided with multiple coaxial heads; sliding rings are arranged at the center of the coaxial heads and fixed on the supporting pipe 1, the video camera 2 is mounted on the fixing bracket of outer case of the sliding ring, a belt pulley arranged on the video camera 2 is connected to the longitudinally rotating motor 18 through a belt, and a transversely rotating belt pulley 12 on the sliding ring is connected to the transversely rotating motor 3 through a belt; wherein the transversely rotating motor 3 is fixed on a bottom plate 11 which is fixed on the supporting pipe 1, the supporting pipe is internally provided with cables 5 and plug-type cable connectors, and the cable connection port 4 is arranged at the tail end where the cables gather.

When the head bracket is working, the transversely rotating motor 3 fixed on the bottom plate drives the longitudinally rotating belt pulley 12 on the sliding ring through a belt, so that the camera 2, the longitudinally rotating motor 18, a top cover 20, and an outer case 14 that are integratively fixed on the outer case of the sliding ring are driven to rotate longitudinally. The longitudinally rotating motor 18 drives, through a belt, the longitudinally rotating belt pulley 17 on the camera 2 to rotate, and an indicator lamp 13 and a photoflash light 9 are fixedly arranged on the camera 2.

As shown in FIGS. 14, 15, 16, 17, and 18, a lower portion 31 of the pancake sliding ring is fixed on the supporting pipe 1, an upper portion 30 of the pancake sliding ring is fixed on a connection rod 29, the support frame of the connection rod is provided with the camera 2, and the belt pulley arranged on the sliding ring is connected to the longitudinally rotating motor 18 through the belt.

When the head bracket provided with a pancake sliding ring is working, the transversely rotating motor 3 fixed on the bottom plate 11 drives, through a belt, the transversely rotating belt pulley 12 on the connection rod 29 to rotate, so that the upper portion 30 of the pancake sliding ring fixed on the connection rod 29, the camera 2, the longitudinally rotating motor 18, the top cover 20, and the outer case 14 that are integratively fixed on the outer case of the sliding ring are driven to rotate transversely. The longitudinally rotating motor 18 drives, through a belt, the longitudinally rotating belt pulley 17 on the camera 2 to rotate.

Figure 19:
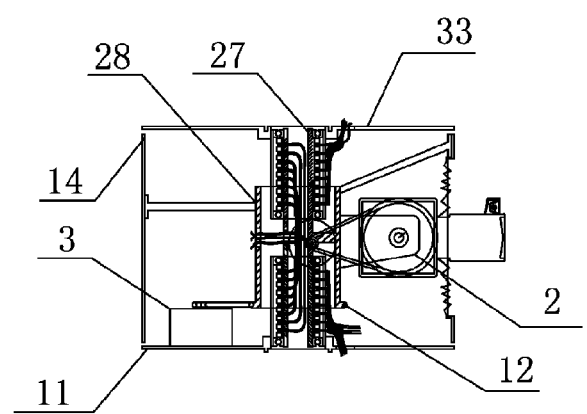
FIG. 19 is a plan view of a head provided with pipe double sliding rings according to the present invention.

As shown in FIG. 19, the coaxial head is further provided a connection pipe 27, where two groups of sliding rings are arranged on the connection pipe 27, and the camera is arranged on the sleeve pipe of the connection pipe.

When the double-camera head bracket is working, the outer case of the lower sliding ring is fixed on the bottom plate 11, the outer case of the upper sliding ring is fixed on a cover plate 33, and the two groups of sliding rings are connected through the connection pipe 27. The connection pipe 27 is provided with a cable-leading hole and fixed with a sleeve pipe 28. The transversely rotating motor 3 fixed on the bottom plate 11 drives, through a belt, the transversely rotating belt pulley on the sleeve pipe 28 to rotate, so that the camera 2, the longitudinally rotating motor 18, the outer case 14 that are integratively fixed on the sleeve pipe 28 are driven through a belt to rotate transversely. The longitudinally rotating motor 18 drives, through a belt, the longitudinally rotating belt pulley 17 on the camera 2 to rotate.

Figure 10:
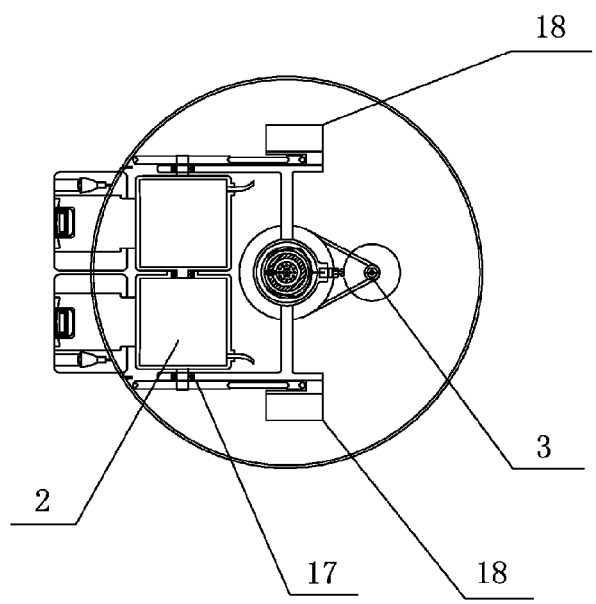
FIG. 10 is a top view of a double-camera coaxial head according to the present invention.

As shown in FIG. 10, when a four-camera head bracket, the left and right longitudinally rotating motors 18 drives the longitudinally rotating belt pulley 17 on their respective camera 2 through the belt.

Figure 11:
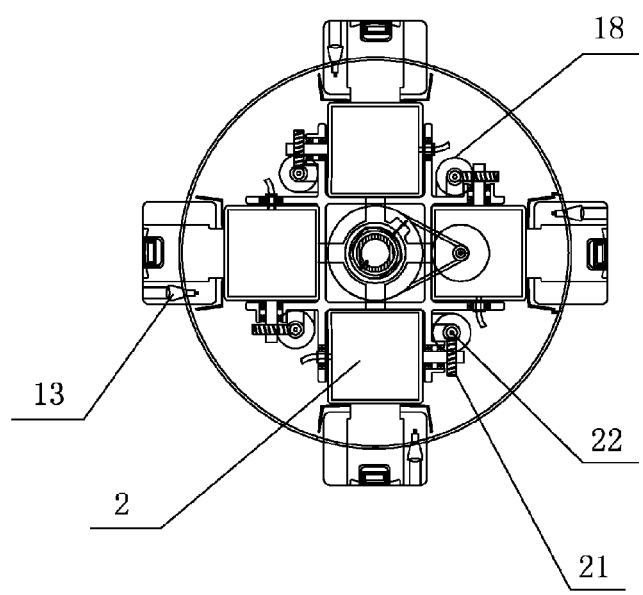
FIG. 11 is a top view of a four-camera coaxial head according to the present invention.
Figure 12:
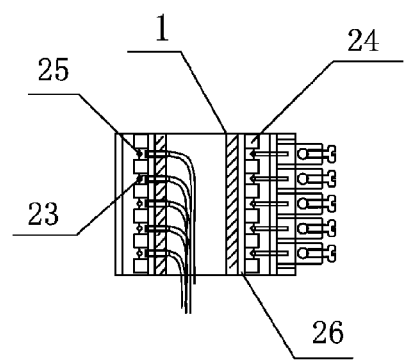
FIG. 12 is a plan view of a pipe sliding head according to the present invention.
Figure 13:
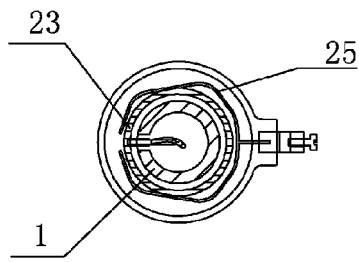
FIG. 13 is a top view of a pipe sliding head according to the present invention.
Figure 14:
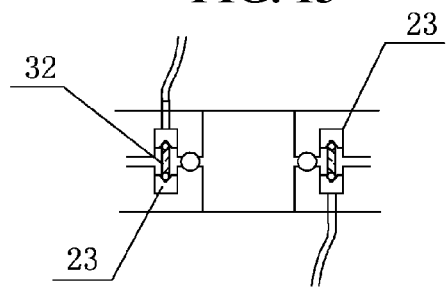
FIG. 14 is a plan view of a pancake sliding ring according to the present invention.
Figure 15:
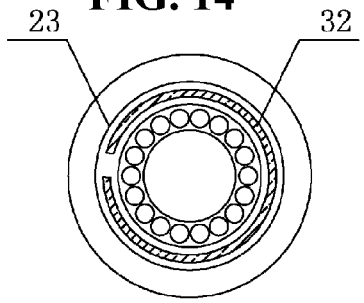
FIG. 15 is a top view of a pancake sliding ring according to the present invention.
Figure 16:
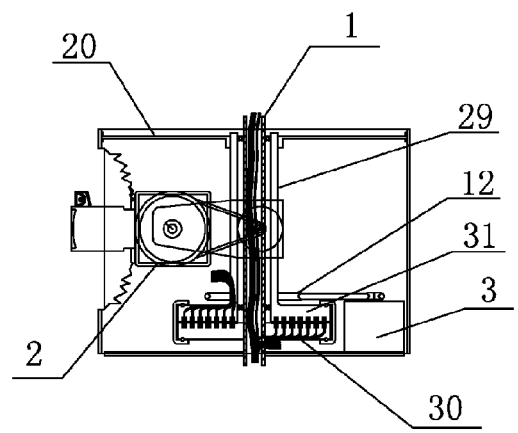
FIG. 16 is a plan view of a head provided with a pancake sliding ring according to the present invention.
Figure 17:
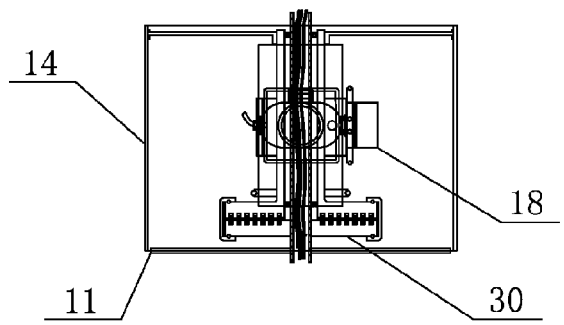
FIG. 17 is a left-side view of a head provided with a pancake sliding ring according to the present invention.
Figure 18:
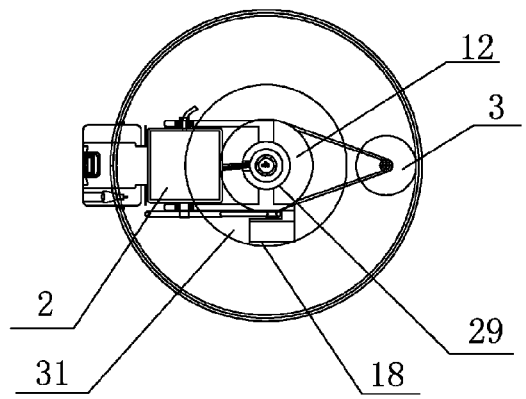
FIG. 18 is a top view of a head provided with a pancake sliding ring according to the present invention.

As shown in FIG. 11, the support of the coaxial head is provided with multiple cameras, and a gear 21 on the axial of the camera is joggled to a worm 22 on the axial of the longitudinally rotating motor.

When the four-camera head bracket is working, each longitudinally rotating motor 18 drives the gear 21 fixed on their respective camera 2 through the worm 22 fixed on the axial of the motor, so that the camera is driven to rotate longitudinally.

Figure 5:
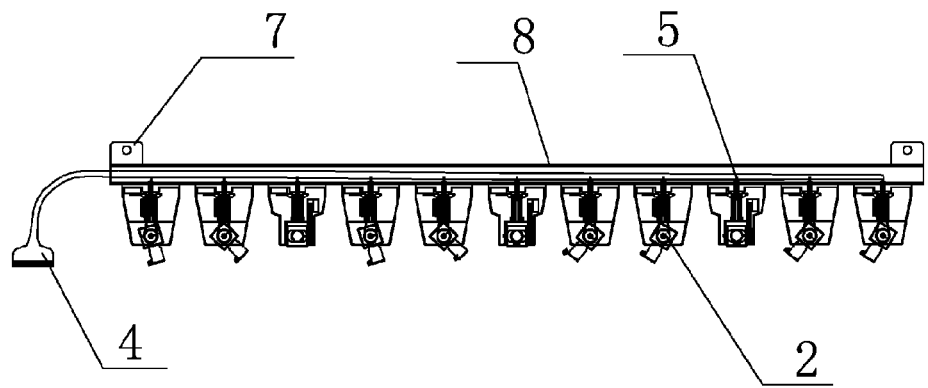
FIG. 5 is a plan view of a suspended head bracket picking up pictures downward according to the present invention.
Figure 6:
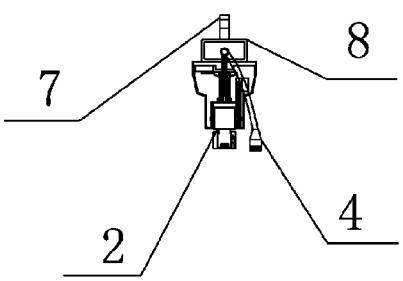
FIG. 6 is a left-side view of a suspended head bracket picking up pictures downward according to the present invention.
Figure 7:
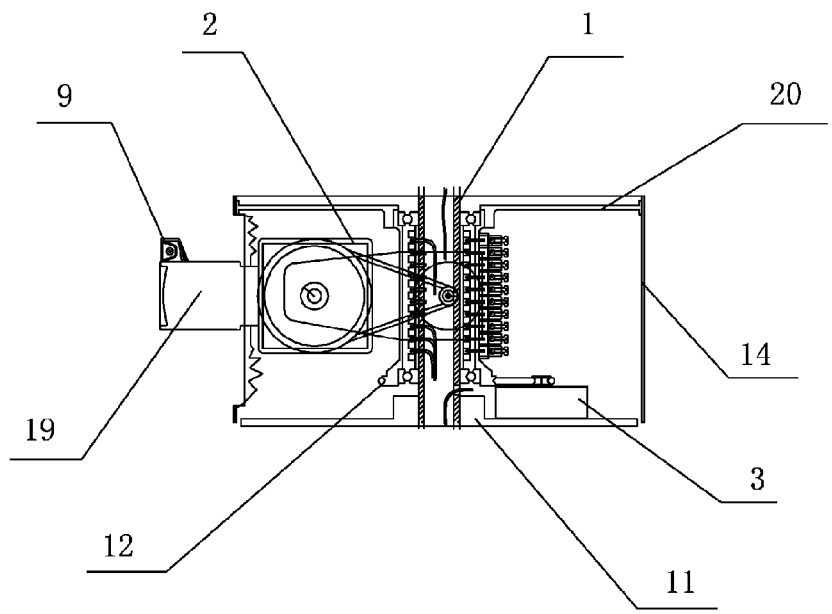
FIG. 7 is a plan view of a coaxial head according to the present invention.
Figure 8:
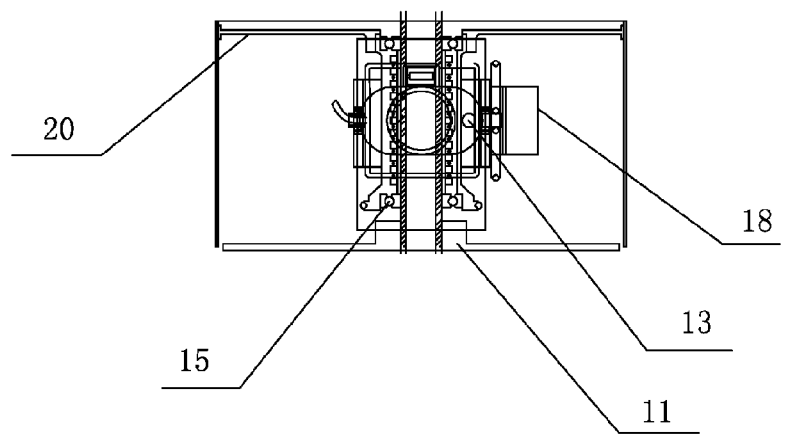
FIG. 8 is a left-side view of a coaxial head according to the present invention.
Figure 9:
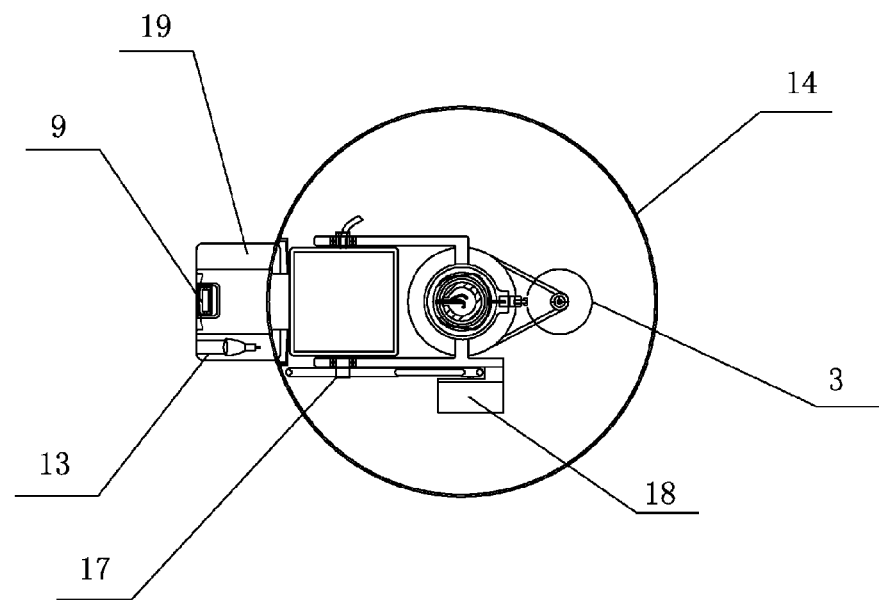
FIG. 9 is a top view of a coaxial head according to the present invention.

As shown in FIGS. 5 and 6, the head bracket is further provided with a rack 7, multiple heads for picking up pictures downward are parallelly and horizontally fixed on the longitudinally supporting rod of the support 6 and the rack 7, the cables 5 are led therethrough, a cable connection port 4 is arranged at the tail end where the cables 5 gather, the camera 2 is provided with a motorized lens, and an indicator lamp and a photoflash light are fixedly arranged on the motorized lens.

When the head bracket for picking up pictures downward is working, the transversely rotating motor 3 fixed on the bottom plate drives the transversely rotating belt pulley 12 to rotate, the camera 2 fixed on the outer case of the sliding ring is connected to the longitudinally rotating motor 18 through a belt, the bottom plate of the head for picking up pictures downward is fixed on a supporting frame 8, and cables of the head gather at the cable connection port 4 through the supporting pipe.

The support 6 may be a tree-shaped support, where multiple heads for picking up pictures downward are arranged thereon horizontally and downward, cables 5 are led therethrough, and a cable connection port 4 is arranged at the tail end where the cables gather.

The support 6 may also be fixed on an electric motor cycle, where the head bracket is arranged on the support 6 and powered by the power supply mounted on the electric motor cycle.

What is claimed is:

1. A head bracket, comprising:
a video camera;
a longitudinally rotating motor;
a transversally rotating motor;
sliding rings;
a cable connection port; and
a support;
wherein
a supporting pipe is arranged at the center of the head bracket and is provided with multiple coaxial heads;
sliding rings are arranged at the center of the coaxial heads and fixed on the supporting pipe, the video camera is mounted on the fixing bracket of outer case of the sliding ring, a belt pulley arranged on the video camera is connected to the longitudinally rotating motor through a belt, and a transversely rotating belt pulley on the sliding ring is connected to the transversely rotating motor through a belt;

the transversely rotating motor is fixed on a bottom plate which is fixed on the supporting pipe, the supporting pipe is internally provided with cables and plug-type cable connectors, and the cable connection port is arranged at the tail end where the cables gather.

2. The head bracket according to claim 1, wherein
the sliding rings are pancake sliding rings, the lower portion of the sliding ring is fixed on the supporting pipe;
the upper portion of the sliding ring is fixed on a connection rod;
the camera is mounted on the support frame of the connection rod; and
the belt pulley arranged on the sliding ring is connected to the longitudinally rotating motor through the belt.

3. The head bracket according to claim 1, wherein
the coaxial head is provided with a connection pipe;
two groups of sliding rings are arranged on the connection pipe; and
the camera is arranged on the sleeve pipe of the connection pipe.

4. The head bracket according to claim 1, wherein
the camera is provided with a motorized lens; and
an indicator lamp and a photoflash light are fixedly arranged on the motorized lens.

5. The head bracket according to claim 1, wherein the support of the coaxial head is parallelly arranged with two cameras.

6. The head bracket according to claim 1, wherein
the support of the coaxial head is provided with multiple cameras; and
a gear on the axial of the camera is joggled to a worm on the axial of the longitudinally rotating motor.

7. The head bracket according to claim 1, wherein the head bracket is fixed on an electric motor cycle.

8. The head bracket according to claim 1, wherein
the head bracket is further provided with a rack; and
multiple group of coaxial heads are vertically and horizontally arranged on the support and the rack.

9. The head bracket according to claim 1, wherein
the head bracket is further provided with a rack;
multiple heads for picking up pictures downward are parallelly and horizontally fixed on the longitudinally supporting rod of the support and the rack;
cables are led therethrough, a cable connection port is arranged at the tail end where the cables gather;
the camera is provided with a motorized lens; and
an indicator lamp and a photoflash light are fixedly arranged on the motorized lens.

10. The head bracket according to claim 1, wherein
the support is a tree-shaped support;
multiple heads for picking up pictures downward are arranged thereon horizontally and downward;
cables are led therethrough; and
a cable connection port is arranged at the tail end where the cables gather.

* * * * *